United States Patent
Bartosch

[19]
[11] Patent Number: 6,164,109
[45] Date of Patent: Dec. 26, 2000

[54] HIGH LOAD NON-LUBRICATED CAM FOLLOWER IN CAN NECKER MACHINE

[76] Inventor: Georg Bartosch, 84 Alpine Ct., Demarest, N.J. 07624

[21] Appl. No.: 09/290,103

[22] Filed: Apr. 12, 1999

[51] Int. Cl.[7] .................................................. B21D 37/01
[52] U.S. Cl. .................................................. 72/94; 492/16
[58] Field of Search .................. 72/94, 452.6, 462; 384/449, 907.1; 492/16

[56] References Cited

U.S. PATENT DOCUMENTS

| | | |
|---|---|---|
| 4,345,798 | 8/1982 | Cortes .................................. 384/907.1 |
| 5,284,394 | 2/1994 | Lemelson ............................... 384/907.1 |
| 5,542,900 | 8/1996 | Burke ........................................ 492/16 |
| 5,676,006 | 10/1997 | Marshall ................................. 72/452.6 |

*Primary Examiner*—Lowell A. Larson
*Attorney, Agent, or Firm*—Eliot S. Gerber

[57] ABSTRACT

A can-making necker machine to form the bottom and neck of two-piece metal cans has pusher rams. Each pusher has a cam follower which follows a track or groove. The cam follower is not lubricated but instead has rolling surfaces which are coated with a low-friction high-impact diamond film.

12 Claims, 4 Drawing Sheets

HIGH LOAD NON-LUBRICATED CAM FOLLOWER IN CAN NECKER MACHINE

FIELD OF THE INVENTION

The present invention relates to cam followers having a non-roller type of bearing and more particularly to such cam followers in production machines used to form the shape of the bottom and necks of two-piece metal cans.

BACKGROUND OF THE INVENTION

A cam follower is a machine element which rolls along a track, or in a groove, to provide guided movement to a device to which it is connected. One type of cam follower is a wheel which is rotatable on a shaft, the wheel and shaft forming a type of bearing on which the surfaces slide relative to each other, without balls or rollers between the surfaces. A bearing is a machine element which reduces friction between fixed and moving parts, and may be a ball bearing, roller bearing or bushing bearing. A bushing is a tubular metal lining used to reduce friction.

A standard, commercially available cam follower consists of thread shaft, roller or needle bearing and an outer race (cam track). The outer race (raceway). typically rolls on the cam (cam track).

To provide smooth rotation and to prevent ceasing of the bearing the cam follower is lubricated. For this purpose the threaded shaft has a bore, through the shaft, which connects the bearing chamber with an outside grease fitting. Lubrication can be provided manually, with grease being pressed into the bearing at regular intervals, or a central lubricating system, which may be automated, may apply grease, under pressure, at regular intervals.

In many instances the central lubricating system is designed and built for the single purpose of lubricating the cam followers. It is especially costly to build and maintain lubricating systems to lubricate multiple cam followers rotating around a stationary cam.

While providing the necessary lubrication to the cam follower rollers, central lubrication can fail. For example, grease may build up in the supply tube. Without lubrication, the cam follower will cease to rotate causing damage to the cam and possibly causing follow-up damage and costly unplanned down-time.

Over-greasing causes a different problem. Excessive grease may cause the outer ring of the cam follower to develop resistance to rotation causing partial sliding of the roller race on the cam. High friction develops at the point of contact between cam follower and the cam as the cam follower is "dragged along" without rotation. The cam follower race can develop a flat which makes it dysfunctional and causing excessive wear on the cam. Cam replacement is usually very costly since it requires several days of down-time.

Many processing machines require the use of cam followers. A cam follower typically rides on a cam, or in a groove representing a cam. The shape of the cam, or groove, determines the ultimate trajectory of the machine component to which the cam follower is attached, e.g. a sawing head being guided along the edge of a shoe sole. Cam followers can also transmit a considerable radial force.

An especially important application of the non-lubricated cam followers of the present invention is in metal can production machinery.

Metal cans are often produced as "two piece cans" which consist of a cylindrical can body with an integral bottom wall and a can top. Millions of such cans are made each day. They are generally made of thin aluminum or steel sheet metal. For example, aluminum cans are used to pack gas pressurized liquids, such as beer and soda. The can must have a certain strength so that it can withstand internal gas pressure as well as the pressures from stacking, dispensing machines and handling. However, thickness of the sheet metal is an important part of the cost of such cans. If the metal may be made thinner, while retaining the required strength, then the cans may be produced at a decreased cost.

One way to obtain can strength, using sheet metal, is to form circular curves in the can bottom. Such curves, viewed from the bottom of the can, are one or more concentric circles in the can bottom and/or can side wall near the bottom. Seen in cross-section such curves are rounded, generally in a hemispherical shape.

The can making machine which forms the shape of the can body is sometimes called a "necker". It operates by applying pressure to the can body after it has been formed into its general body shape, e.g., a cylinder or multi-angular shape with an integral bottom wall.

The necker is a type of tool and die in which the sheet metal is placed between the tool, having a protrusion, and the die, having a matching indentation. The tool and die are brought together, under pressure forcing the sheet metal to assume the shape of the protrusion-indentation.

Cans are produced at high speed, for example, at the speed of up to 2500 cans per minute. The can bodies are squeezed ("necked") between opposite moving ram assemblies.

In such can making necker machinery, the cam follower usually rides on a stationary cam with the rotational axis parallel to the cam's surface. The cam followers are riding on the cam's surface, one on each side of the cam, at the same time they are rotating around the cam's axis on a 14" radius. The cam followers are mounted on pushers (rams) which are moved back and forth, by their attached cam followers, in an accelerating and decelerating movement following the cam's profile. Considerable radial force is developed on the cam follower during the can necking (extrusion) operation.

Lubrication to the cam followers is provided through a central lubrication system. This system requires a rotational coupling as the cam followers are carried around the machine axis. The seals in the rotational couplings are subject to wear and the coupling over time will often leak grease.

Grease lubrication, manual or central, is a burden. Before any adjustments to the machine set-up can be made, grease has first to be cleaned from the parts. The added clean-up time burden is felt most during emergency stops. When grease reaches the final product, it has to be rejected. The grease, which must be FDA approved as being edible, is expensive.

In U.S. Pat. No. 5,467,628, assigned to Belvac Production Machinery, incorporated by reference, a sliding bushing 20 surrounds a ram 22 in a can bottom reprofiler machine. The tail end of the ram carries cam follower wheels 56 which rides against a cam track 57. This general type of double-ram can forming machine is also shown in U.S. Pat. Nos. 4,732,027 and 4,272,977.

In U.S. Pat. No. 5,368,398 a diamond bearing assembly includes opposite thrust bearing rings. In U.S. Pat. No. 4,468,138 a polycrystalline diamond insert is used in the thrust roller bearing of a Turbodrill. U.S. Pat. No. 4,708,496 shows a thrust roller bearing for oil well downhole drilling. U.S. Pat. No. 5,254,141 relates to adhering a diamond coating to a substrate. The above-mentioned patents are incorporated by reference.

SUMMARY OF THE INVENTION

In accordance with the present invention a cam follower comprises a bearing having a shaft and an outer race (raceway) which rotates on the shaft. The race has a outer diameter face which rolls along i.e. follows, a cam. The cam may be a raised track or a groove. The bearing is a "non-roller" bearing meaning it does not have balls, rollers, needles (thin rollers) or other rolling elements between the shaft and its race. However it may include a bushing insert. The bushing has an inner diameter face which may be fixed on the shaft and the race rotates on the bushing's outer diameter face. Alternatively the bushing may be fixed on the race so that its inner diameter face rotates on the outer diameter face of the shaft.

The cam follower is not lubricated, which avoids the problems associated with supplying grease to the cam follower. Instead the friction surfaces are coated with a diamond coating. That diamond coating is a low surface tension non-hydrogenated diamond film which is a high-impact low-friction coating. In the case of a bushing the inner surface of the bushing and the inner surface of the race are diamond coated. In a non-bushing non-roller bearing the outer surface of the shaft and the inner surface of the race are diamond coated.

Since no oil or grease is used for lubrication, there is no grease spilling around the machine. The dry diamond lubricant is so wear-resistant that it may be used for months, or even years, without being replaced. The race (wheel) is formed of steel or of a lightweight alloy, e.g., aluminum, so it is relatively light in weight.

It is an objective of the present invention to eliminate the need for lubrication in heavy duty cam followers. Since the cam followers do not need lubrication the machine design is simpler and the operating cost is lower.

Eliminating the need for lubrication opens new ways for designing machinery, lowers maintenance costs and housekeeping efforts. So, for example, machines can be designed without central lubricating systems.

Since the outer race (wheel or racer) of the non-lubricated cam follower rides on a relatively large surface of the coated steel bushing, it withstands higher pressure than one with roller bearings. Roller bearing provides only a line contact which translates in comparatively much higher pressure per square inch on the outer race internal diameter,. Due to such higher pressure lubrication is needed to prevent failure because of wear in cam followers with roller bearings.

BRIEF DESCRIPTION OF THE DRAWINGS

Other features and objectives of the present invention will be apparent from the following detailed description, taken in conjunction with the accompanying drawings. In the drawings.

DETAILED DESCRIPTION OF THE INVENTION

Figure 1:
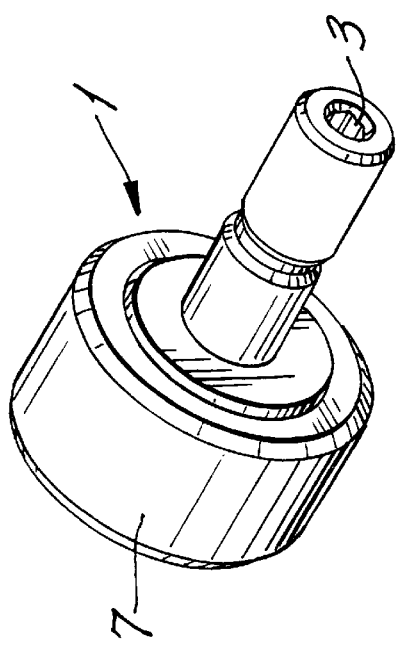
FIG. 1 is a perspective view of a cam follower of the present invention without a bushing.
Figure 2:
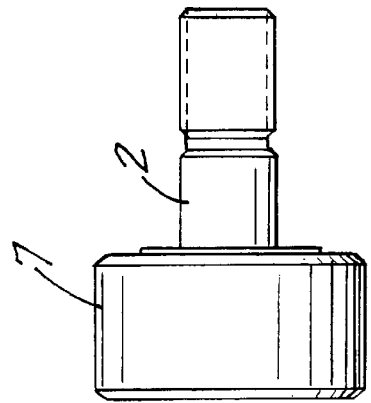
FIG. 2 is a side plan view of the cam follower of FIG. 1.
Figure 3:
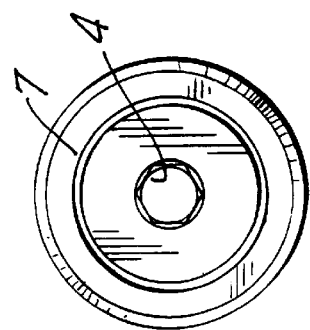
FIG. 3 is an end plan view of the cam follower of FIG. 1.
Figure 4:
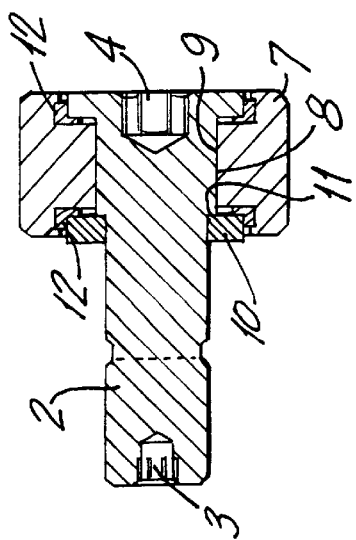
FIG. 4 is a cross-sectional view of the cam follower of FIG. 1.
Figure 5:
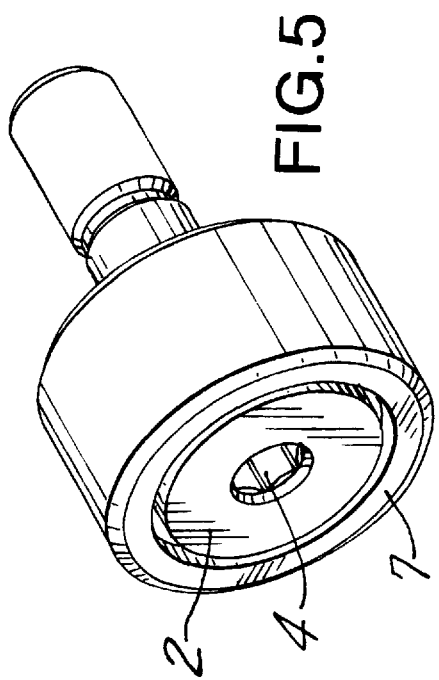
FIG. 5 is a perspective view of another embodiment of a cam follower of the present invention, this embodiment having a bushing.
Figure 6:
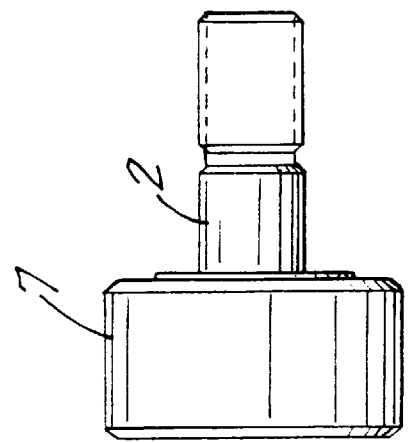
FIG. 6 is a side plan view of the cam follower of FIG. 5.
Figure 7:
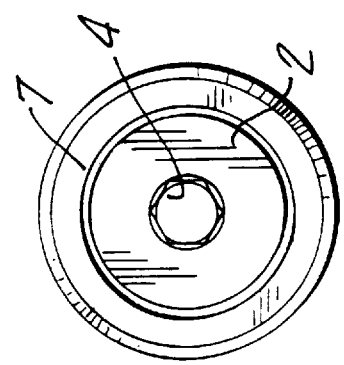
FIG. 7 is an end plan view of the cam follower of FIG. 5.
Figure 8:
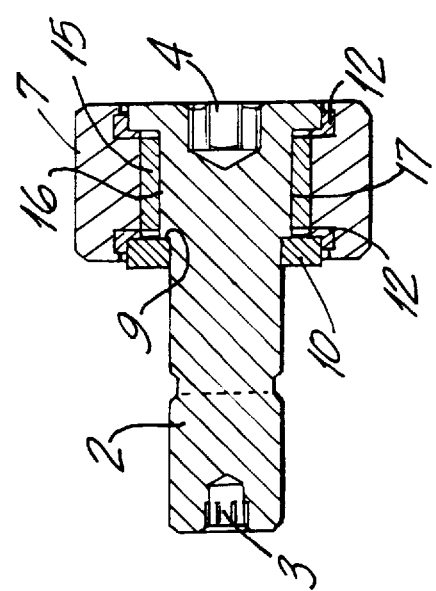
FIG. 8 is a cross-sectional view of the cam follower of FIG. 5.

Referring now to the Figures, preferred embodiments of the invention are illustrated.

As shown in FIGS. 1–4, the cam follower (1) is comprised of a thread shaft (2) with a grind cylindrical section and a flange head. On both ends of the shaft are hexagonal cavities (3) and (4). An Allen hexagonal wrench is inserted into either of these cavities to prevent the cam follower shaft from rotating during installation. The cavities (3) and (4) can also be used to adjust the clearance against the cam when eccentric installation bushings are used.

A tubular outer race (7) (racer or wheel) mates and freely rotates on the shaft (2). The race (7) and shaft (2) are preferably of a metal such as steel or aluminum coated with a non-hydrogenated diamond film which is a high-impact low-friction coating. Similarly the outer face (9) of the shaft (2), at least at the portion upon which race (7) freely rotates, is also coated with the same diamond film.

A retaining ring (10) holds the outer race (7) in position on shaft (2) with the ring (10) resting on flange (11) of the shaft (2). Dust seals (12) are used to provide spacing of the outer race (7) relative to the flange (9) of the shaft (2) and retaining ring (10). The dust seals (12) also prevent dust from entering the gliding low-friction surface between the outer face of the shaft (6) and the inner face (8) of race (7).

In the alternative embodiment of FIGS. 5–8 a tubular bushing (15) is fixed onto the race (7) at the inside face of the race (7). The bushing (15) is precision made of a suitable metal such as steel. The inner face (16) of bushing (15) is coated with a non-hydrogenated diamond film which is a high-impact low-friction coating. The outer race (7) (racer or wheels) is of a metal such as steel or aluminum. The outer face (17) of shaft (2) is also coated with the same diamond coating.

In the embodiment of FIGS. 5–8 as in the embodiment of FIGS. 1–4, a retaining ring (10) holds race (7) in position on the shaft (2) and rests on flange (11). Dust seals (12) are also used in this embodiment for the same purpose as in the prior embodiment.

Alternatively, and not shown, the inside diameter of the bushing is coated and the bushing is pressed into the outer race.

In all embodiments the outer diameter of the outer race (5) is designed to be softer than the surface of the cam, i.e., to wear out before the cam. The internal diameter of the outer race (5) is treated with the same diamond surface coating.

In the cam followers of FIGS. 1–8 compared to conventional cam followers, there are no bores for lubrication supply in the shaft, as the outer race turns on the bushing or shaft without lubrication.

Figure 9:
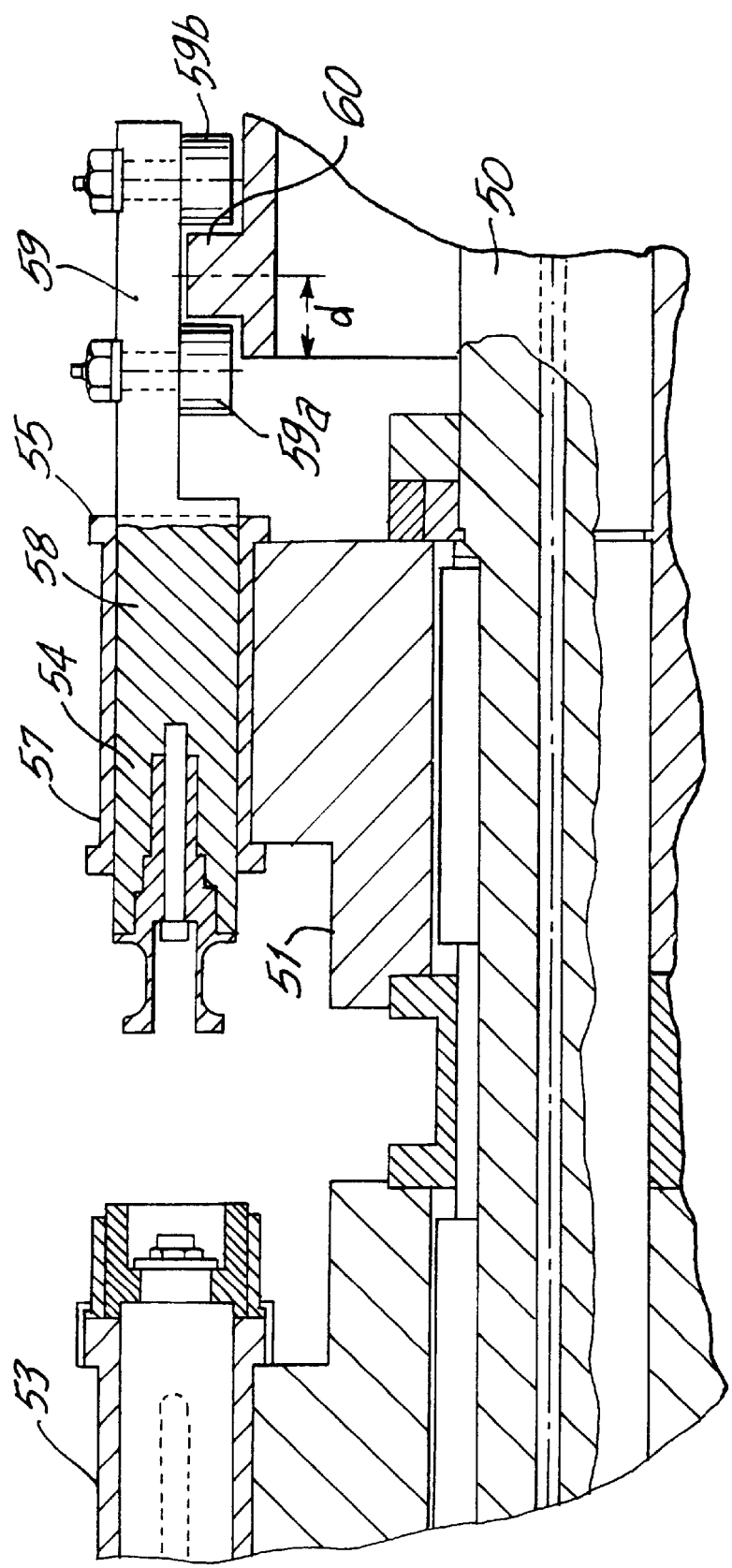
FIG. 9 is a front cross-sectional view of a turret in a can necker machine to rotate ram assemblies in the necking and bottom forming stage of metal can production.

FIG. 9 shows a cross-sectional view of a portion of a metal can body forming (necking) machine with the cam followers of the present invention. It typically operates at 2500 cans per minute. A central shaft (50) is motor driven and rotates. A casing (51) is mounted to the shaft (50) and rotates with it. A series of ram assemblies are mounted on casing (51). FIG. 9 shows only two opposite ram assemblies (53), (54). However, generally the casing (51) will carry six or more pairs of ram assemblies arranged in a circle (in a plane vertical to the drawing of FIG. 9). The ram assembly (54) includes a fixed bushing (housing) (57) having a cylindrical bore and a ram (piston) 58. The tail portion (59) of the ram 58 carries two freely rotatable wheels (59a), (59b), which are the cam followers. The wheels (59a), (59b) are mounted on opposite sides of a fixed track (60) e.g. the cam, which is a rectangular elongated protrusion forming a complete circle. The cam track (60) is fixed and does not rotate. The cam track (60), at different points in its length, is further advanced (left in FIG. 9) which causes the arm to be extended, or further withdrawn (right in FIG. 9) which causes the ram to be withdrawn, i.e., the distance "d" changes.

Figure 10:
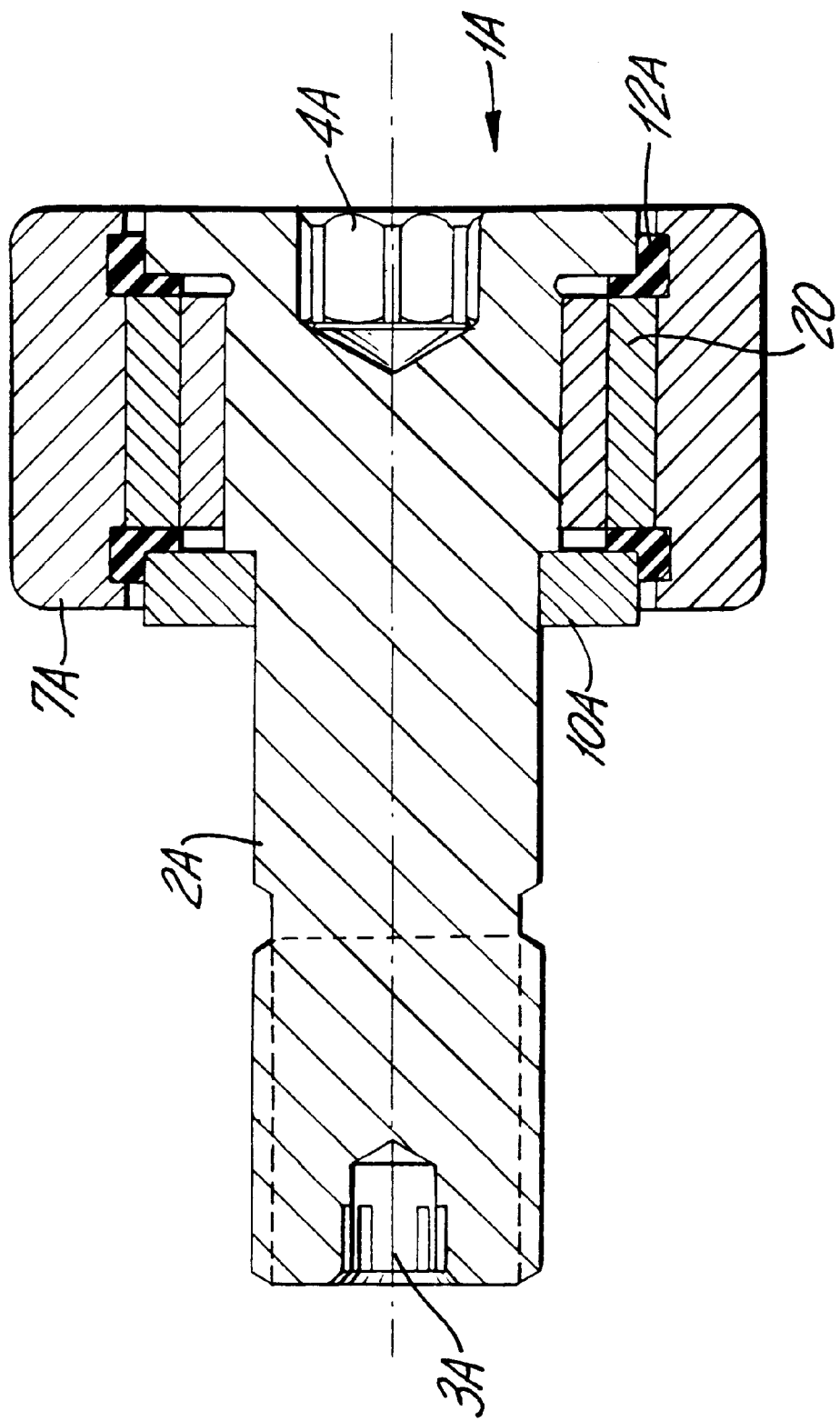
FIG. 10 is an enlarged cross-sectional view of an alternative embodiment of a cam follower of the present invention.

In the cam follower embodiment of FIG. 10 the cam follower (1A), as in the other embodiments, is composed of a thread shaft (2A) with a grind cylindrical section and a flange head. Hexagonal cavities (3A) and (4A) are located at opposite ends of the shaft (2A).

A tubular outer race (7A) has a bushing insert (20) fixed thereto. The shaft (2A) also has a bushing insert (21) fixed thereto. The inner face of insert (20) and the outer face of insert (21) roll (freely rotate) relative to each other. Those faces of inserts (20) (21) are coated with a low-friction high-impact diamond film coating.

As in the other embodiments a retaining ring (10A) rests at flange (11A) and holds the outer race (7A) in position on the shaft (2A). Dust seals (12A) provide spacing and prevent dust from entering the cam follower.

What is claimed is:

1. A metal can production necker including a rotatable turret and a plurality of pairs of can forming reciprocal movable rams, a track-like cam adapted to control the movement of the rams and a plurality of cam followers each having a rotatable race which rolls on the cam, characterized in that each cam follower comprises a metal shaft fixed to a ram and having an external face, a metal race having an inner face rotatably mounted on the shaft without rolling elements therebetween, the cam follower not being lubricated, and low-friction high-impact diamond film coatings on the mating and relatively rotatable inner face of the race and external face of the shaft, the said diamond films not being over-coated with another material and being in rotational contact with each other.

2. A necker as in claim 1 wherein at least some of said rams each carries a pair of said cam followers, the cam having opposite faces and the races of each pair of cam followers rolling on opposite faces of said cam.

3. A necker as in claim 1 wherein said shaft has a flange thereon, a ring mounted against said flange and holding said race onto said shaft.

4. A metal can production necker including a rotatable turret and a plurality of pairs of can forming reciprocal movable rams, a track-like cam adapted to control the movement of the rams and a plurality of cam followers each having a rotatable race which rolls on the cam, characterized in that each cam follower comprises a shaft fixed to a ram, a metal bushing having an external face, the bushing being fixed to the shaft, a metal race having an inner face rotatably mounted on the external face of the bushing without rolling elements therebetween, the cam follower not being lubricated, and low-friction high-impact diamond film coatings on the mating and relatively rotatable inner face of the race and external face of the bushing, the said diamond films not being over-coated with another material and being in rotational contact with each other.

5. A necker as in claim 4 wherein at least some of said rams each carries a pair of said cam followers, the cam having opposite faces and the races of each pair of cam followers rolling on opposite faces of said cam.

6. A necker as in claim 4 wherein said shaft has a flange thereon, a ring mounted against said flange and holding said race onto said shaft.

7. A metal can production necker including a rotatable turret and a plurality of pairs of can forming reciprocal movable rams, a track-like cam adapted to control the movement of the rams and a plurality of cam followers each having a rotatable race which rolls on the cam, characterized in that each cam follower comprises a metal shaft fixed to the ram and having an external face, a race having an inner face rotatably mounted on the shaft without rolling elements therebetween, a tubular metal bushing having an inner face is fixed on the race, the cam follower not being lubricated, and a low-friction high-impact diamond film coating on the mating and relatively rotatable inner face of the bushing and the external face of the shaft, the said diamond films not being over-coated with another material and being in rotatable contact with each other.

8. A necker as in claim 7 wherein at least some of said rams each carries a pair of said cam followers, the cam having opposite faces and the races of each pair of cam followers rolling on opposite faces of said cam.

9. A necker as in claim 7 wherein said shaft has a flange thereon, a ring mounted against said flange and holding said race onto said shaft.

10. A metal can production necker having a rotatable turret and a plurality of pairs of can forming reciprocal movable rams, a track-like cam adapted to control the movement of the rams and a plurality of cam followers each having a rotatable race which rolls on the cam, characterized in that each cam follower comprises a shaft fixed to a ram and having an external face, a race having an inner diameter face rotatably mounted on the shaft without rolling elements therebetween, a metal shaft bushing is fixed on the shaft, the shaft tubular bushing having an external face, a metal race tubular bushing is fixed on the race, the race bushing having an internal face, the cam follower not being lubricated, and low-friction high-impact diamond film coatings on the mating and relatively rotatable inner face of the race bushing and the external face of the shaft bushing, the said diamond film coatings not being over-coated with another material and being in rotational contact with each other.

11. A necker as in claim 10 wherein at least some of said rams each carries a pair of said cam followers, the cam having opposite faces and the races of each pair of cam followers rolling on opposite faces of said cam.

12. A necker as in claim 10 wherein said shaft has a flange thereon, a ring mounted against said flange and holding said race onto said shaft.

* * * * *